(12) United States Patent
Iwamoto et al.

(10) Patent No.: US 8,795,879 B2
(45) Date of Patent: Aug. 5, 2014

(54) ELECTRONIC COMPONENT AND METHOD OF MANUFACTURING THE SAME

(75) Inventors: Tadashi Iwamoto, Yamaguchi (JP); Tomoyuki Tashiro, Yamaguchi (JP); Kazumitsu Honda, Yamaguchi (JP); Toshiaki Shimizu, Nara (JP); Tadashi Yamane, Yamaguchi (JP); Makoto Chijimatsu, Yamaguchi (JP)

(73) Assignee: Panasonic Corporation, Osaka (JP)

( * ) Notice: Subject to any disclaimer, the term of this patent is extended or adjusted under 35 U.S.C. 154(b) by 62 days.

(21) Appl. No.: 13/372,534

(22) Filed: Feb. 14, 2012

(65) Prior Publication Data

US 2012/0214049 A1 Aug. 23, 2012

(30) Foreign Application Priority Data

Feb. 17, 2011 (JP) .................. 2011-031587

(51) Int. Cl.
*H01M 2/02* (2006.01)
*H01M 2/30* (2006.01)

(52) U.S. Cl.
CPC ..................... *H01M 2/30* (2013.01)
USPC .......................................... 429/178; 429/163

(58) Field of Classification Search
CPC ..................................................... H01M 2/30
USPC .......................................................... 429/178
See application file for complete search history.

(56) References Cited

U.S. PATENT DOCUMENTS

2009/0296318 A1* 12/2009 Kawahito et al. ............. 361/540

FOREIGN PATENT DOCUMENTS

| JP | 6-045202 | 2/1994 |
| JP | 2006-286959 | 10/2006 |

* cited by examiner

*Primary Examiner* — Gary Harris
(74) *Attorney, Agent, or Firm* — Wenderoth, Lind & Ponack, L.L.P.

(57) ABSTRACT

An electronic component includes an electrochemical element, an electrolyte and an outer housing. The electrochemical element includes leading terminals, an anode, a cathode, a separator, and an insulating member. Respective first ends of the leading terminals are connected to the anode and the cathode. The separator is provided between the anode and the cathode. The insulating member is provided in at least one of the separator, the anode and the cathode. The electrochemical element, impregnated with the electrolyte, has a first end face formed by laminating the anode, the separator and the cathode in sequence, and second ends of the leading terminals are led out of the first end face. The outer housing accommodates the electrochemical element and the electrolyte. The insulating member covers the separator in positions corresponding to the first ends of the leading terminals. An end of the insulating member protrudes from the first end face.

9 Claims, 8 Drawing Sheets

ELECTRONIC COMPONENT AND METHOD OF MANUFACTURING THE SAME

BACKGROUND OF THE INVENTION

1. Field of the Invention

The present invention relates to an electronic component to be used for various electronic apparatuses and a method of manufacturing the same, and more particularly to an electronic component such as a capacitor or a battery which has an electrochemical element winding an electrode foil that connects a leading terminal thereto.

2. Description of the Related Art

In recent years, with digitization of electronic apparatus, it has been demanded to reduce size, to increase capacity and to reduce equivalent series resistance (hereinafter referred to as ESR) in electronic components to be used in circuits for power output/input, for example, a smoothing circuit or a control circuit.

With reference to FIGS. 8 and 9, description will be given of an electrolytic capacitor according to an example of a conventional electronic component. FIG. 8 is a developed perspective view showing a capacitor element of the conventional electrolytic capacitor. FIG. 9 is a sectional view showing the conventional electrolytic capacitor.

As shown in FIG. 9, the electrolytic capacitor has capacitor element 3 constituting an electrochemical element, an electrolytic solution (not shown) constituting an electrolyte, and outer housing 11 for accommodating capacitor element 3 and the electrolytic solution. Ends 1a and 2a of leading terminals 1 and 2 are connected to capacitor element 3 respectively, and furthermore, other ends 1b and 2b of leading terminals 1 and 2 are led to an outside of outer housing 11. Capacitor element 3 is accommodated in outer housing 11 in order to lead each of other ends 1b and 2b of leading terminals 1 and 2 to the outside.

Outer housing 11 is constituted by outer case 12 and sealing member 13. Outer case 12 is formed of a metal and accommodates capacitor element 3 impregnated with the electrolytic solution. Sealing member 13 has through holes 13a and 13b for inserting leading terminals 1 and 2 therethrough, respectively. Sealing member 13 is disposed in an opening part of outer case 12, and an outer peripheral surface of outer case 12 is narrowed down to form throttling portion 12a so that the opening portion of outer case 12 is sealed. Rubber packing is used for sealing member 13.

Moreover, capacitor element 3 is formed by winding anode foil 4 and cathode foil 5 with insulating separator 6 provided therebetween as shown in FIG. 8. Anode foil 4 is formed by roughening a foil formed of a valve metal such as aluminum through an etching treatment, and furthermore, forming an anodic oxide film (not shown) on a surface of the foil carrying out a chemical conversion treatment. Cathode foil 5 is formed of a valve metal such as aluminum. Ends 1a and 2a are connected to anode foil 4 and cathode foil 5 at connecting portions 1d and 2d, respectively. Ends 1b and 2b are led out of an end face of capacitor element 3 formed by winding anode foil 4, cathode foil 5 and separator 6.

Insulating members 7 and 8 are stuck to separators 6 in order to coat positions corresponding to ends 1a and 2a with separators 6, respectively. In some cases, insulating members 7 and 8 are directly stuck and fixed to anode foil 4 and cathode foil 5 in order to directly cover ends 1a and 2a connected to anode foil 4 and cathode foil 5.

In an electrolytic capacitor, generally, separator 6 provided between anode foil 4 and cathode foil 5 is reduced in a thickness and a density in order to decrease the ESR. In that case, there is a fear that a burr generated in formation of ends 1a and 2a or a burr of connecting portions 1d and 2d at which ends 1a and 2a are connected might break through separator 6, resulting in an increase in generation of short circuits. On the other hand, referring to the electrolytic capacitor according to the related art, insulating members 7 and 8 are stuck to separator 6 placed in the corresponding positions to ends 1a and 2a which is a main factor for the generation of the short circuits. Consequently, low ESR can be implemented, and at the same time, short-circuit resistance can be improved so that reliability can be enhanced.

As prior art documents related to the invention of the present application, for example, there are known Unexamined Japanese Patent Publication No. 2006-286959 and Unexamined Japanese Patent Publication No. H06-45202.

In order to prevent contact of other end 1b of leading terminal 1 led from the end face of capacitor element 3 formed by the winding and cathode foil 5, contact of other end 2b of leading terminal 2 and anode foil 4, and contact of metallic outer case 12 and anode foil 4, an end of insulating separator 6 is protruded from the end face most greatly. For this reason, insulating members 7 and 8 cannot be recognized visually. Accordingly, it is impossible to decide whether insulating members 7 and 8 are normally attached or not and whether they are disposed in predetermined positions or not after fabrication of capacitor element 3. In other words, there might be generated a defective product in which insulating members 7 and 8 are not normally attached to the inner part of capacitor element 3 or they are abnormally disposed even if they are attached after capacitor element 3 is fabricated. If the defective product of capacitor element 3 is not eliminated but flows out, there is a fear that short-circuit resistance cannot be ensured stably in an electrolytic capacitor using capacitor element 3.

SUMMARY OF THE INVENTION

An electronic component according to the present invention includes an electrochemical element, an electrolyte, and an outer housing. The electrochemical element includes a plurality of leading terminals each of which has a first end and a second end, an anode and a cathode, a separator, and an insulating member. The first ends of the leading terminals are connected to the anode and the cathode, respectively. The separator is provided between the anode and the cathode. The insulating member is provided on at least one of the separator, the anode and the cathode. The electrochemical element includes a first end face formed by providing the anode, the separator and the cathode in sequence, and the second ends of the leading terminals are pulled out of the first end face. The electrochemical element is impregnated with the electrolyte. The outer housing accommodates the electrochemical element and the electrolyte. The separator is covered with the insulating member in at least a position corresponding to the first ends of the leading terminals, and one end of the insulating member protrudes from the first end face.

As described above, according to the present invention, it is possible to confirm that the insulating member is disposed in an inner part of the electrochemical element through visual recognition from an outside of the electrochemical element. Also after fabricating the electrochemical element, therefore, it is possible to distinguish presence of the attachment of the insulating member. As a result, the electronic component according to the present invention can accurately eliminate a defective product of the electrochemical element to which the insulating member is not normally attached through the visual recognition from the outside after forming the electrochemical element. As a result, it is possible to provide an electronic component in which low ESR is obtained and very excellent short-circuit resistance is ensured stably.

DETAILED DESCRIPTION OF THE INVENTION

First Exemplary Embodiment

Figure 1:
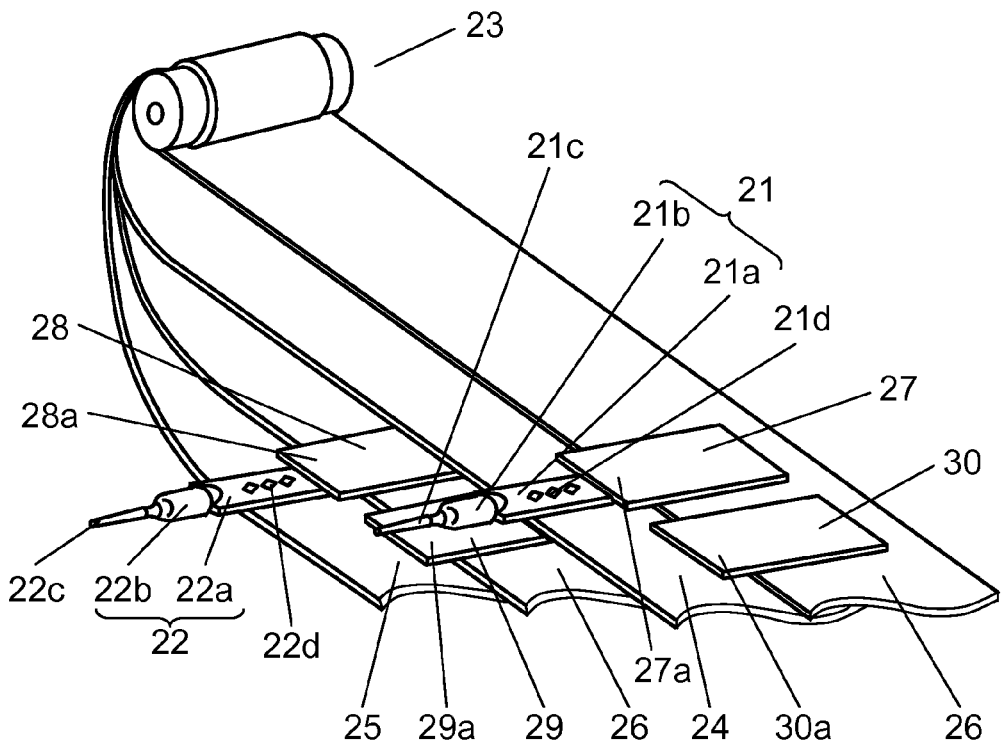
FIG. 1 is a developed perspective view showing a capacitor element of an electrolytic capacitor according to an example of an electronic component in accordance with a first exemplary embodiment of the present invention.
Figure 2:
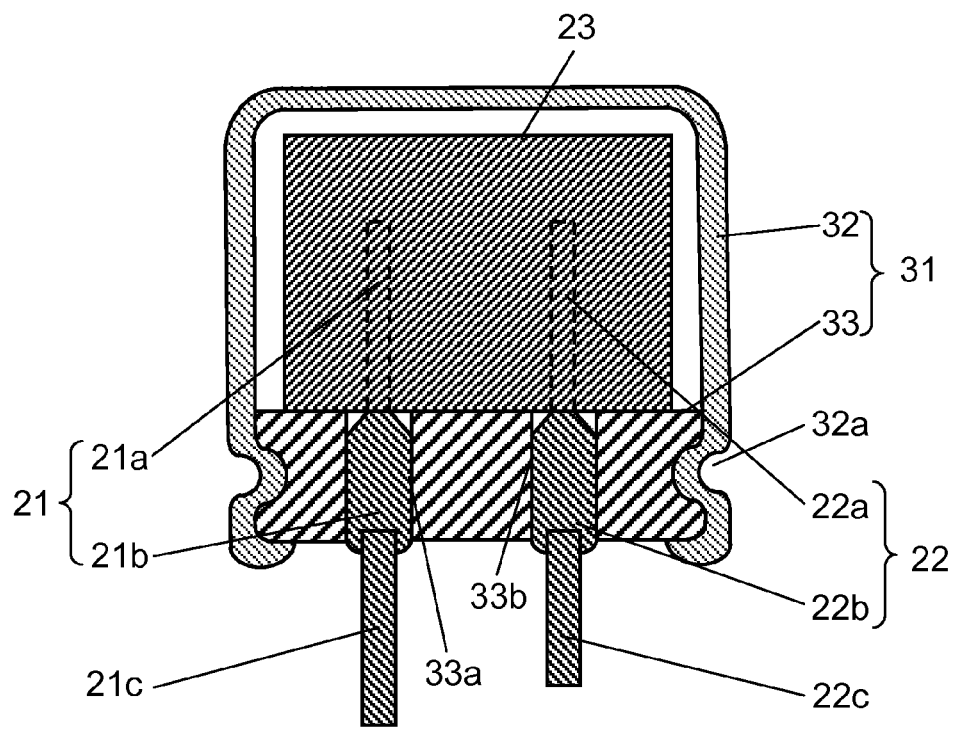
FIG. 2 is a sectional view showing the electrolytic capacitor according to the first exemplary embodiment of the present invention.

FIG. 1 is a developed perspective view showing a capacitor element of an electrolytic capacitor according to an example of an electronic component in accordance with a first exemplary embodiment of the present invention. FIG. 2 is a sectional view showing the electrolytic capacitor according to the first exemplary embodiment of the present invention. FIGS. 3A to 3E and FIGS. 4A and 4B are views showing a process for manufacturing the electrolytic capacitor according to the first exemplary embodiment of the present invention.

As shown in FIG. 2, the electrolytic capacitor includes capacitor element 23 constituting an electrochemical element, an electrolytic solution (not shown) constituting an electrolyte, and outer housing 31. Capacitor element 23 and the electrolytic solution are accommodated in outer housing 31.

Moreover, outer housing 31 has outer case 32 and sealing member 33. Outer case 32 is shaped as a bottomed cylinder, and accommodates capacitor element 23 impregnated with the electrolytic solution. Sealing member 33 has through holes 33a and 33b for inserting other ends (second ends) 21b and 22b of leading terminals 21 and 22, respectively. Sealing member 33 is disposed to cover an opening portion of outer case 32, and the opening portion of outer case 32 is sealed by throttling an outer peripheral surface of outer case 32 to form throttling portion 32a.

As shown in FIG. 1, capacitor element 23 has anode foil 24 constituting an anode, cathode foil 25 constituting a cathode, separator 26, insulating members 27, 28, 29 and 30, and leading terminals 21 and 22. Anode foil 24 is formed by a foil constituted by a valve metal such as aluminum, and a surface thereof is roughened by an etching treatment and a dielectric oxide film (not shown) is formed on the surface by a chemical conversion treatment. Cathode foil 25 is formed of a valve metal such as aluminum. Insulating members 27, 28, 29 and 30 are fixed to a predetermined position of separator 26. Anode foil 24 and cathode foil 25 are laminated and wound with separator 26 therebetween. Leading terminals 21 and 22 have ends (first ends) 21a and 22a connected to anode foil 24 and cathode foil 25 at connecting portions 21d and 22d, respectively. Ends 21b and 22b are led out of end face 23a formed by winding anode foil 24, cathode foil 25 and separator 26.

Capacitor element 23 may have a structure in which anode foil 24 and cathode foil 25 are laminated with separator 26 therebetween and are not then wound but planar anode foil 24 and cathode foil 25 are laminated with separator 26 therebetween.

The electrochemical element indicates general active and passive elements which fulfill electrical functions and, for example, a capacitor element in the case of a capacitor, a battery element in the case of a battery, a semiconductor device in the case of a semiconductor, and the like. In particular, the capacitor element includes an electric double layer capacitor, an electrochemical capacitor and the like in addition to the electrolytic capacitor which will be described in the present exemplary embodiment.

In the case of the electrolytic capacitor, furthermore, the anode foil and the cathode foil are used as an anode and a cathode as in the present exemplary embodiment. In the case of an electrochemical element of another type, however, it is also possible to use an anode and a cathode which have shapes and materials adapted thereto, respectively.

Moreover, insulating members 27, 28, 29 and 30 are disposed to cover separator 26 at a position corresponding to ends 21a and 22a of leading terminals 21 and 22. In addition, the ends of insulating members 27 and 28 protrude from end face 23a of capacitor element 23 on the side where ends 21b and 22b of leading terminals 21 and 22 are led out. More specifically, the ends of insulating members 27 and 28 protrude from all of ends of anode foil 24, cathode foil 25 and separator 26 which constitute end face 23a.

The positions corresponding to ends 21a and 22a of leading terminals 21 and 22 in separator 26 will be described below. First of all, there will be considered a state in which anode foil 24 and cathode foil 25 are laminated and wound with separator 26 therebetween, that is, a state in which capacitor element 23 is formed. In this case, anode foil 24 and cathode foil 25, and respective ends 21a and 22a of leading terminals 21 and 22 overlap with each other in some parts. In the parts, the positions corresponding is indicated as a portion of separator 26 which comes in contact with ends 21a and 22a of leading terminals 21 and 22 at end 21a and 22a side of leading terminals 21 and 22. Alternatively, the positions corresponding is indicated as a portion of separator 26 which comes in contact with a concavo-convex portion generated by forming connecting portions 21d and 22d at sides of anode foil 24 and cathode foil 25 in a portion in which anode foil 24 and cathode foil 25, and ends 21a and 22a of leading terminals 21 and 22 overlap with each other.

In the electrolytic capacitor according to the present exemplary embodiment, four insulating members 27, 28, 29 and 30 are provided to cover a surface side or a back side of an outer surface in a predetermined portion of separator 26. Insulating member 27 covers a range including the portion of separator 26 which comes into contact with end 21a of leading terminal 21. Insulating member 28 covers a range including the portion of separator 26 which comes into contact with end 22a of leading terminal 22. Insulating member 29 covers a range including the portion of separator 26 which comes into contact with a concavo-convex portion generated by forming connecting portion 21d on anode foil 24 side. Insulating member 30 covers a range including the portion of separator 26 which comes into contact with a concavo-convex portion generated by forming connecting portion 22d on cathode foil 25 side. All of these four portions do not need to be covered with the insulating member but at least one portion may be covered.

For separator 26, moreover, it is possible to use cellulose, kraft, Manila, esparto, sisal hemp, hemp, red hemp, cotton as well as synthetic fiber based materials, for example cupra, polyethylene terephthalate, polybutylene terephthalate, polyphenylene sulfide, nylon, aromatic polyamide, polyimide, polyamideimide, polyetherimide, rayon and the like, materials containing a glassy substance and the like, or their mixed papers. For insulating members 27, 28, 29 and 30, furthermore, there are selected materials which have an insulating property and do not influence the characteristic of the electrolytic capacitor. Moreover, it is preferable that the same material as separator 26 should be utilized for insulating members 27, 28, 29 and 30. In the case in which an electrolytic solution is used as an electrolyte, consequently, insulating members 27, 28, 29 and 30 have a transmitting property of the same electrolytic solution as separator 26. Therefore, a contact of the electrolytic solution with anode foil 24 and cathode foil 25 is inhibited with difficulty. Accordingly, it is possible to minimize reduction in a leading rate of an electrostatic capacitance or increase in ESR due to the provision of insulating members 27, 28, 29 and 30.

Although shapes of insulating members 27, 28, 29 and 30 may be properly selected depending on shapes of ends 21a and 22a of leading terminals 21 and 22 or shapes of connecting portions 21d and 22d, moreover, a square shape is preferred in respect of workability of attachment to separator 26 or ease of confirmation of arrangement.

Insulating members 27, 28, 29 and 30 are fixed into a range including a predetermined portion of separator 26 by an adhesive, pressure bonding or the like. In the case in which the adhesive is used, a material which does not influence the characteristic of the electrolytic capacitor is selected. More specifically, there is selected a phenol based material, an epoxy based material, a cyanoacrylate based material, a polyimide based material, an acryl based material, a silicone based material, a rubber based material, a hot melt based material or the like.

Insulating members 27, 28, 29 and 30 may be directly fixed to anode foil 24 and cathode foil 25 in order to cover at least separator 26 in a corresponding position to ends 21a and 22a of leading terminals 21 and 22 in addition to the fixation of separator 26 to an outer surface.

For leading terminals 21 and 22, moreover, there is generally used a metallic base material containing aluminum or the like which is the same as a base material utilized as the electrode material of anode foil 24 and cathode foil 25.

Furthermore, ends 21a and 22a of leading terminals 21 and 22 are connected to anode foil 24 and cathode foil 25 respectively, and anode foil 24 and cathode foil 25 are wound provided therebetween, and at the same time, leading terminals 21 and 22 are involved. Accordingly, it is preferable that ends 21a and ends 22a take an almost flat shape. Moreover, ends 21b and 22b of leading terminals 21 and 22 are inserted into through holes 33a and 33b provided on sealing member 33 and are thus led to an outside. In respect of maintenance of adhesion properties to through holes 33a and 33b, accordingly, it is preferable that ends 21b and 22b should take a shape of a round bar. By forming an external terminal in connection to a circuit board through bond of metallic wires 21c and 22c to ends 21b and 22b of leading terminals 21 and 22, it is possible to easily carry out shape processing, solder plating or the like.

In addition, connecting portions 21d and 22d are formed by superposing respective ends 21a and 22a of leading terminals 21 and 22 on anode foil 24 and cathode foil 25 and connecting them through a needle caulking connecting process, an ultrasonic connecting process, a cold pressure welding process or the like. In connecting portions 21d and 22d, anode foil 24 and cathode foil 25, and each of ends 21a and 22a of leading terminals 21 and 22 are brought to partially have intermetallic coupling.

Moreover, the electrolytic solution is a liquid electrolyte, and is constituted by dissolving a solute in a solvent. For the solvent, there is used an organic solvent represented by ethylene glycol, γ-butyrolactone, sulfolane or the like. For the solute, there is used a salt containing an acid component such as adipic acid or maleic acid, a base component such as ammonia, or the like. An electrolytic solution can appropriately contain an additive which is intended for gas absorption, stabilization of a withstand voltage, pH regulation, oxidation inhibition or the like.

Furthermore, a solid electrolyte may be used for the electrolyte or the solid electrolyte and a liquid electrolyte may be used together. A suitable specific example of the solid electrolyte includes a conductive polymer such as polythiophene or its derivative, and the like. A dopant is taken into the conductive polymer and plays a part in expression of an electrical conductivity. For a typical dopant agent, there is used acid such as p-toluene sulfonic acid or polystyrene sulfonic acid. It is preferable to provide a solid electrolytic layer (not shown) constituted by a conductive polymer such as polythiophene or its derivative between anode foil 24 and cathode foil 25 which form capacitor element 23. For convenience, such a state is defined to be impregnation.

For the sealing member 33, moreover, it is possible to use a resin material such as an epoxy resin in addition to a rubber material such as EPT or IIR.

Next, a method of manufacturing an electrolytic capacitor according to an example of an electronic component according to the first exemplary embodiment having the structure mentioned above will be described with reference to FIGS. 1 to 4B.

Figure 3A:
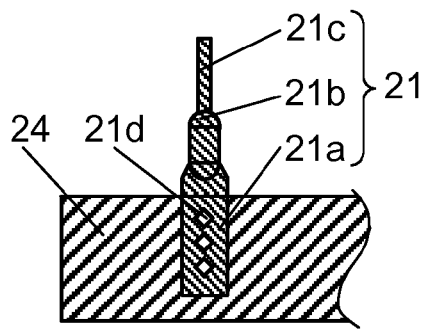
FIGS. 3A to 3E are views showing a process for manufacturing the electrolytic capacitor according to the first exemplary embodiment of the present invention.
Figure 3B:
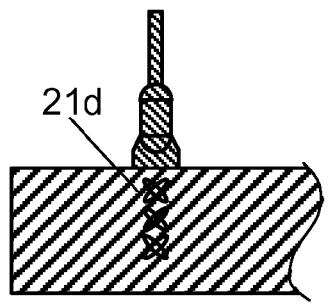

FIGS. 3A to 3E and FIGS. 4A and 4B are views showing a process for manufacturing the electrolytic capacitor according to the first exemplary embodiment. FIG. 3A is an enlarged view showing a main part of a step of connecting end 21a of leading terminal 21 to anode foil 24. Anode foil 24 is cut to have a certain width and length, and end 21a of leading terminal 21 is superposed on anode foil 24 and is connected to anode foil 24 through a needle caulking connecting process so that connecting portion 21d is formed. In a portion in which anode foil 24 and end 21a of leading terminal 21 overlap with each other, a through hole is formed on a center of connecting portion 21d on end 21a side of leading terminal 21 by the needle caulking connecting process. On the other hand, as shown in FIG. 3B, end 21a of leading terminal 21 is radially and partially folded back from the through hole formed on the center of connecting portion 21d so that a convex portion is formed by the needle caulking connecting process at anode foil 24 side. As the process for connecting leading terminal 21, it is also possible to use an ultrasonic connecting process, a cold pressure welding process or the like in addition to the needle caulking connecting process.

In the same manner as anode foil 24, moreover, cathode foil 25 is cut to have a certain width and length and connects end 22a of the leading terminal.

A surface of anode foil 24 has a surface area increased properly by etching, deposition of a metallic particle or the like, which is not shown, and a dielectric layer constituted by an oxide film is further formed on the surface. The dielectric layer is obtained by carrying out anodic oxidation over a valve metal such as aluminum constituting an electrode material to form an oxide film, and furthermore, the dielectric layer may be formed on the electrode material by deposition or coating.

If necessary, a surface treatment, for example, etching, formation of an oxide film, deposition of a metal particle, adhesion of a conductive particle such as carbon, or the like may be carried out over the surface of cathode foil 25 in order to enhance a contact state with an electrolytic solution or a solid electrolytic layer, which is not shown.

The step of connecting leading terminals 21 and 22 to anode foil 24 and cathode foil 25 respectively is carried out, while insulating members 27, 28, 29 and 30 are attached to a part of separator 26 provided between anode foil 24 and cathode foil 25. The attaching step will be described below for convenience.

Figure 3C:
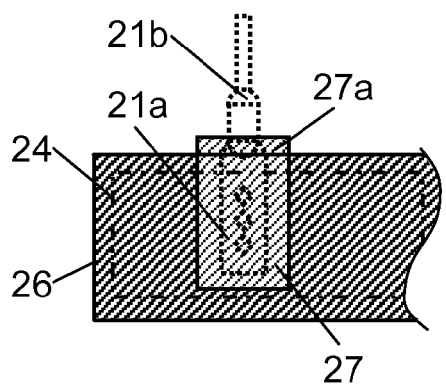
Figure 3D:
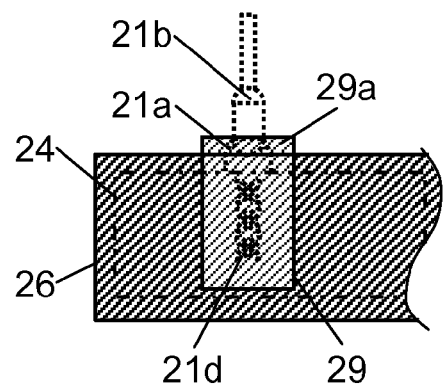
Figure 3E:
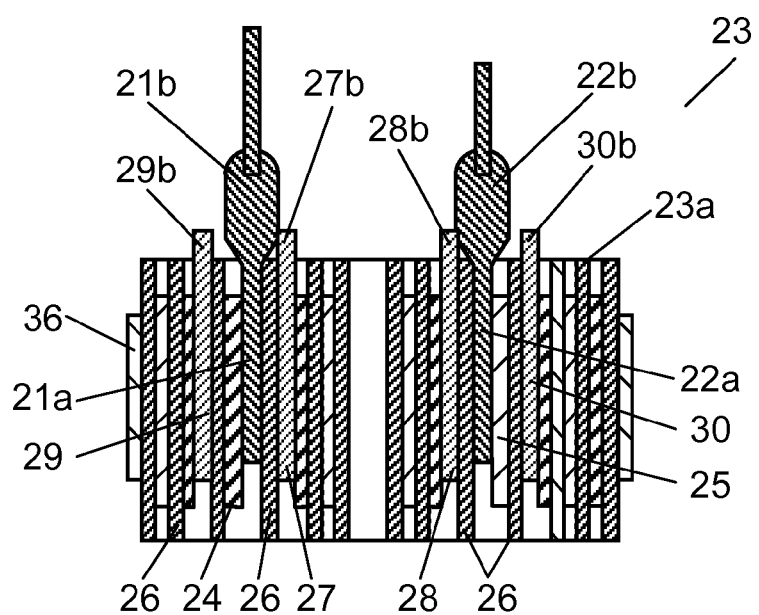

Next, anode foil 24 and cathode foil 25 are laminated and wound with separator 26 therebetween to which insulating members 27, 28, 29 and 30 are partially attached so that capacitor element 23 is thus fabricated. FIG. 3E is a sectional view showing capacitor element 23 obtained after the winding. Anode foil 24 and cathode foil 25 are laminated with separator 26 provided therebetween, and they are wound around a core and are wound like a roll to take an almost cylindrical shape. In that case, ends 21b and 22b of leading terminals 21 and 22 are lead out. Finally, the winding of an outer peripheral side surface is stopped with insulating tape 36 so that capacitor element 23 is fabricated. Insulating members 27, 28, 29 and 30 are provided to have protruded portions 27b, 28b, 29b and 30b which are protruded from end face 23a on the side where ends 21b and 22b of leading terminals 21 and 22 are led out in end faces formed by the winding. Protruded portions 27b, 28b, 29b and 30b are provided to be protruded from all of ends of anode foil 24, cathode foil 25 and separator 26 which constitute end face 23a.

Insulating members 27, 28, 29 and 30 are previously attached into predetermined positions of separator 26 before the step of fabricating capacitor element 23. FIGS. 3C and 3D are enlarged views showing a main part of the step of attaching insulating members 27 and 29 to separator 26 provided in contact with anode foil 24. As shown in FIG. 3C, insulating member 27 is disposed on the outer surface of separator 26 in order to have projecting portion 27a which has one of ends protruded from the end of separator 26 by a predetermined dimension before the step of fabricating capacitor element 23. The outer surface of separator 26 may be a surface side or a back side of separator 26. The end of separator 26 serves as a side where end 21b of leading terminal 21 is pulled out when capacitor element 23 is fabricated at a subsequent step. Furthermore, insulating member 27 is disposed to cover a portion of separator 26 which is predicted to correspond to at least end 21a of leading terminal 21 when capacitor element 23 is fabricated at a subsequent step. As to whether insulating member 27 is normally arranged, it is possible to detect a position by means of a sensor or the like.

As shown in FIG. 3D, moreover, insulating member 29 is disposed on the outer surface of separator 26 in order to have projecting portion 29a which has one of ends protruded from the end of separator 26 by a predetermined dimension before the step of fabricating capacitor element 23. Insulating member 29 is disposed to cover the portion of separator 26 which is predicted to correspond to at least end 21a of leading terminal 21 when capacitor element 23 is fabricated at a subsequent step.

In the same manner as insulating members 27 and 29, insulating members 28 and 30 are also disposed on the outer surface of separator 26 in order to have projecting portions 28a and 30a, each of which has one of ends protruded from the end of separator 26 by a predetermined dimension. Insulating members 28 and 30 are disposed to cover the portion of separator 26 which is predicted to correspond to at least end 22b of leading terminal 22 when capacitor element 23 is fabricated at a subsequent step. Moreover, insulating members 27, 28, 29 and 30 are fixed to separator 26 by bonding with an adhesive or pressure bonding.

At the subsequent step of fabricating the capacitor element 23, there is a fear that an assembly variation might be caused by a winding shift when anode foil 24, cathode foil 25 and separator 26 are wound. In order to ensure the protruding dimensions of protruded portions 27b, 28b, 29b and 30b obtained after the winding, accordingly, the dimensions of projecting portions 27a, 28a, 29a and 30a are determined in consideration of the assembly variation caused by the winding shift.

Insulating members 27, 28, 29 and 30 may be stuck and fixed to anode foil 24 and cathode foil 25 in order to directly cover ends 21a and 22a of leading terminals 21 and 22 connected to anode foil 24 and cathode foil 25.

Referring to capacitor element 23 which is fabricated, next, it is decided whether insulating members 27, 28, 29 and 30 are attached or not and whether they are normally disposed or not.

First of all, it is decided whether insulating members 27, 28, 29 and 30 are attached or not. In the decision, presence of protruded portions 27b, 28b, 29b and 30b of insulating members 27, 28, 29 and 30 which are protruded from end face 23a of capacitor element 23 is recognized visually. In other words, in the case in which it can be confirmed that protruded portions 27b, 28b, 29b and 30b are protruded from end face 23a of capacitor element 23, it is decided that insulating members 27, 28, 29 and 30 are attached. On the other hand, in the case in which it cannot be confirmed that protruded portions 27b, 28b, 29b and 30b are protruded from end face 23a of capacitor element 23, it is decided that insulating members 27, 28, 29 and 30 are not attached.

In the case in which it is decided that insulating members 27, 28, 29 and 30 are attached, furthermore, it is decided whether insulating members 27, 28, 29 and 30 are normally disposed or not.

In the decision of the arrangement of insulating members 27, 28, 29 and 30, if it is decided that they are not normally disposed, particularly, insulating members 27, 28, 29 and 30 are shifted in a direction of a winding axis of capacitor element 23, that is, insulating members 27, 28, 29 and 30 are shifted in a length direction (a longitudinal direction). The shift of the arrangement of insulating members 27, 28, 29 and 30 is divided into the case in which they are shifted in the length direction and the case in which they are shifted in a transverse direction. Although the shift in the transverse direction is caused by the assembly variation due to the winding shift, it is controlled to some degree by means of a guide portion of a winding machine. Therefore, the shift is included within a range of approximately 0.1 mm. For this reason, a degree of influence is low. On the other hand, a shift in the length direction is caused by a variation in a connecting position in the connection of one of ends 21a and 22a of leading terminals 21 and 22 to anode foil 24 and cathode foil 25 or a variation in a winding start position of each member of anode foil 24, cathode foil 25 and separator 26, and the degree of influence is high.

The decision of the shift in the length direction of insulating members 27, 28, 29 and 30 is carried out by visually recognizing the positional relationship between protruded portions 27b and 29b and end 21b of leading terminal 21 led out of end face 23a, and the positional relationship between protruded portions 28b and 30b and end 22b of leading terminal 22 led from end face 23a. In other words, it is decided whether insulating member 27 covers at least the portion of separator 26 corresponding to ends 21a and 22a of leading terminals 21 and 22 or not based on a length in which one of the ends of insulating member 27 is protruded from end face 23a and a length of each of ends 21b and 22b of leading terminals 21 and 22. More specifically, the positions in the length direction of insulating members 27 and 29 are judged from the length in which protruded portions 27b and 29b are protruded, and it is decided whether they are protruded from the predetermined positions in the length direction or not. Consequently, it is possible to decide whether insulating members 27 and 29 cover the overlapping portion of end 21a of leading terminal 21 with anode foil 24 in at least the length direction or not. Referring to the overlapping portion of end 21a with anode foil 24, it is also possible to make the decision by visually recognizing the position of end 21b of leading terminal 21 and the protrusion length of end 21b or it is also possible to make the decision based on connecting position data of leading terminal 21 which is prestored in a control portion (not shown) such as a processor. As a result, it is decided that a non-reject product having no shift in the length direction is obtained if insulating member 27 is protruded from a predetermined position in the length direction, and a reject product having the shift is obtained if insulating member 27 is not protruded. Similarly, protruded portions 28b and 30b are decided.

Capacitor element 23 decided to be the reject product is eliminated and prevented from flowing to a subsequent assembling step.

In the case in which the electrolytic capacitor according to the present exemplary embodiment is mass produced continuously at a high speed, it is preferable that protruded portions 27b, 28b, 29b and 30b of insulating members 27, 28, 29 and 30 should be visually recognized by using an image recognition camera.

In this case, when a material which can be applied to separator 26 is to be selected for insulating members 27, 28, 29 and 30, colors of insulating members 27, 28, 29 and 30 are similar to a color of separator 26 or various shadows can be formed by an ambient light. For this reason, precision in distinction of the image recognition camera is reduced. In order to enhance the precision in the distinction, therefore, it is preferable that protruded portions 27b, 28b, 29b and 30b should be visually recognized by means of the image recognition camera while a light is irradiated thereon.

Figure 4A:
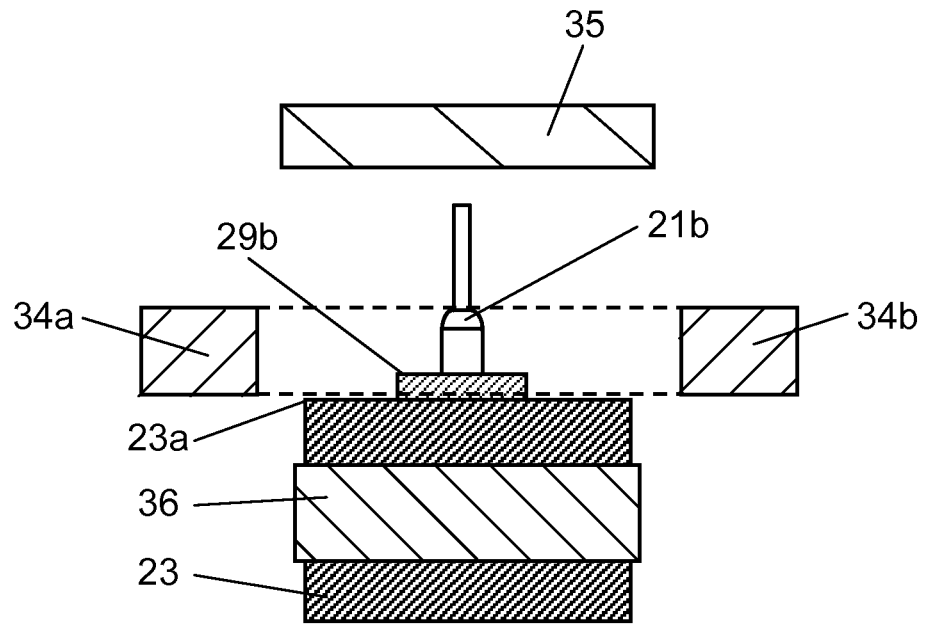
FIGS. 4A and 4B are views showing the process for manufacturing the electrolytic capacitor according to the first exemplary embodiment of the present invention.
Figure 4B:
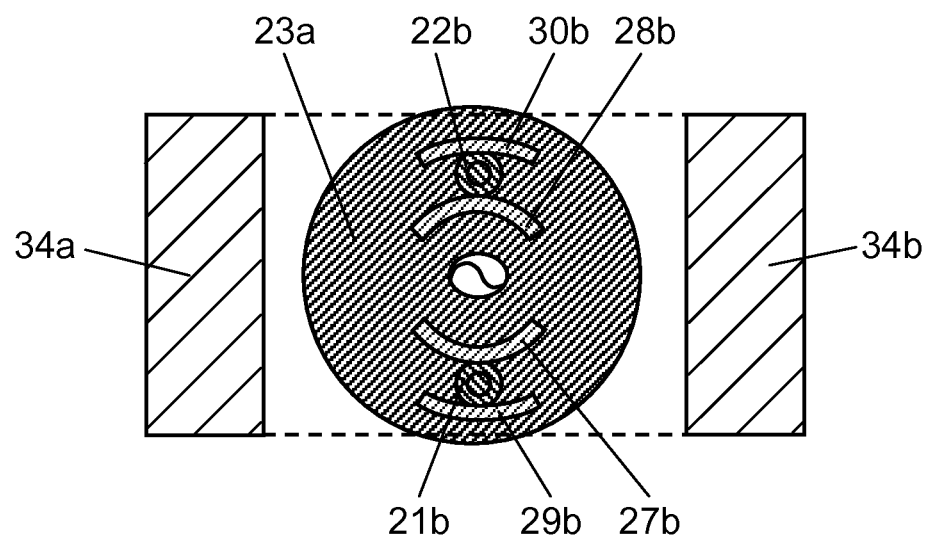

FIG. 4A is a view showing the step of deciding the attachment state of insulating members 27, 28, 29 and 30 by means of the image recognition camera while irradiating a light on capacitor element 23, as seen from a side surface. FIG. 4B is a top view showing the same step.

First of all, capacitor element 23 is fixed and light sources 34a and 34b are disposed opposite to each other around capacitor element 23. Then, a straight light is irradiated by light sources 34a and 34b in almost parallel with end face 23a of capacitor element 23 on the side where ends 21b and 22b of leading terminals 21 and 22 are led out. The lights of light sources 34a and 34b are irradiated on protruded portions 27b, 28b, 29b and 30b of insulating members 27, 28, 29 and 30 and ends 21b and 22b of leading terminals 21 and 22, and are thus scattered.

Consequently, it is possible to increase a difference in a contrast between protruded portions 27b, 28b, 29b and 30b and ends 21b and 22b of leading terminals 21 and 22 where the light is scattered and the other portions, that is, the ends of separator 26, anode foil 24 and cathode foil 25 which constitute end face 23a. Consequently, it is possible to make a difference in a contrast on a level capable of deciding the shift of the arrangement through image recognition camera 35.

The difference in the contrast capable of deciding the shift through image recognition camera 35 is determined relatively, and a color or an intensity of the light to be irradiated is preferably regulated depending on a similarity state of a color included in a visual recognizing target and a performance of the image recognition camera.

It is preferable that the light should be irradiated to make a contrast clearer in order to prevent a shadow from being formed when end face 23a of capacitor element 23 is seen from above. More specifically, it is preferable that a plurality of light sources should be disposed circularly to surround the side surface of capacitor element 23. For example, in the case in which capacitor element 23 is mass produced continuously at a high speed, it is necessary to deliver capacitor element 23 by means of a conveyer. For this reason, if the light sources are disposed in two directions having an almost opposing relationship for interposing the conveyer therebetween and the straight light is irradiated on capacitor element 23, a productivity can be enhanced, which is preferred.

If the protrusion lengths of protruded portions 27b, 28b, 29b and 30b are equal to or greater than 0.1 mm, it is possible to make the decision through the visual recognition. In consideration of a variation in an irradiation angle of the straight light emitted from light sources 34a and 34b, a variation in a fixing state of capacitor element 23 or the like, it is preferable that the protrusion length should be equal to or greater than 0.5 mm. Consequently, it is possible to make the decision with high precision by reliably irradiating a light on only protruded portions 27b, 28b, 29b and 30b of insulating members and ends 21b and 22b of leading terminals 21 and 22. On the other hand, although the upper limit dimensions of the protrusion lengths of protruded portions 27b, 28b, 29b and 30b are not restricted under a condition of easiness of visual recognition, a contrast or the like, they are restricted by a standard value of a whole length dimension of electrolytic capacitor 23 or the like. In other words, if the dimensions of protruded portions 27b, 28b, 29b and 30b are excessively great, an assembling failure is caused. For set dimensions of protruded portions 27b, 28b, 29b and 30b which ensure stable precision in the decision and do not influence the condition for assembling the electrolytic capacitor, accordingly, a range of 0.5 mm to 0.7 mm is preferable in consideration of a variation.

As light sources 34a and 34b for irradiating the straight light, it is preferable to use a light emitting diode. A color of the light which causes easy scattering to an irradiating target is preferable, and a white light emitting diode is inexpensive and easily utilized.

Next, the positional relationship between protruded portions 27b and 29b and end 21b of leading terminal 21 where the light is scattered and the positional relationship between protruded portions 28b and 30b and end 22b of leading terminal 22 are visually recognized by means of image recognition camera 35, thereby distinguishing a non-reject product and a reject product. Image recognition camera 35 is provided above end face 23a of capacitor element 23 in such a manner that a whole surface of end face 23a can be recognized visually.

Then, capacitor element 23 decided to be the non-reject product is transferred to an assembling step.

As shown in FIG. 2, leading terminals 21 and 22 led out of capacitor element 23 are inserted into through holes 33a and 33b provided on sealing member 33 from ends 21b and 22b respectively so that sealing member 33 is attached to capacitor element 23.

In a state before or after the attachment of sealing member 33, it is also possible to restore and form the oxide film on the surface of anode foil 24 by immersing capacitor element 23 in a chemical solution and applying a voltage between leading terminals 21 and 22.

Thereafter, an electrolytic layer is formed between anode foil 24 and cathode foil 25 in capacitor element 23. In the case of a liquid electrolyte represented by an electrolytic solution, capacitor element 23 is accommodated in outer case 32 together with the electrolytic solution to form an electrolytic layer.

The attachment of sealing member 33 to capacitor element 23 may be carried out in a stage before or after the formation of the electrolytic layer.

An electrolytic solution in a certain amount is previously injected into outer case 32 and the electrolytic solution is impregnated when capacitor element 23 is accommodated in outer case 32. Alternatively, capacitor element 23 is immersed in an impregnation vessel storing the electrolytic solution (a degree of vacuum is regulated in some cases) and is pulled up, and is then accommodated in outer case 32.

An excessive part of the electrolytic solution with which capacitor element 23 cannot be completely impregnated may be held in outer case 32.

In the case of the solid electrolyte, for example, poly-3,4-ehylenedioxythiophene (PEDOT) to be a conductive polymer or the like is used. In this case, a dispersion solution having the PEDOT dispersed therein is impregnated with capacitor element 23, and capacitor element 23 is then pulled up and dried to form an electrolytic layer. A monomer solution such as 3,4-ehylenedioxythiophene, an oxidant solution containing a p-toluene sulfonic ferric salt or the like, or a solution such as ethanol as a solvent may be impregnated with capacitor element 23 to cause a chemical polymerization reaction in capacitor element 23, thereby forming the PEDOT.

Next, outer case 32 is wound and fastened from the outer peripheral side surface to form throttling portion 32a, thereby sealing the opening portion of outer case 32.

Protruded portions 27b, 28b, 29b and 30b of capacitor element 23 may be crushed when capacitor element 23 is fitted in sealing member 33 or when capacitor element 23 is inserted into outer case 32 to seal the opening portion of outer case 32 after the decision of the quality of capacitor element 23.

An insulating outer resin formed by an epoxy resin or the like may be used as outer housing 31 to cover capacitor element 23 with outer housing 31, and furthermore, to lead ends 21b and 22b of leading terminals 21 and 22 to an outside of outer housing 31.

An insulating terminal plate (not shown) may be disposed to come in contact with the opening portion of outer case 32. Metallic wires 21c and 22c connected to ends 21b and 22b of leading terminals 21 and 22 led from an outer surface of sealing member 33 sealing the opening portion of outer case 32 are inserted into a pair of through holes (not shown) provided on the insulating terminal plate. Then, metallic wires 21c and 22c are bent at an almost right angle in opposite directions to each other and are accommodated in a groove portion (not shown) provided on the outer surface of the insulating terminal plate. Thus, it is also possible to employ an electrolytic capacitor of a surface mounting type.

After the opening portion of outer case 32 is sealed or the insulating terminal plate is attached, a voltage may be properly applied between leading terminals 21 and 22 to chemically convert anode foil 24 again.

As described above, according to the electronic component and the method of manufacturing the electronic component in accordance with the first exemplary embodiment, the ends of insulating members 27, 28, 29 and 30 are protruded from end face 23a of electrochemical element 23 on the side where ends 21b and 22b of leading terminals 21 and 22 are led out. Consequently, it is possible to visually recognize, from the outside of electrochemical element 23, that insulating members 27, 28, 29 and 30 are disposed in electrochemical element 23. Also after electrochemical element 23 is once fabricated, therefore, it is possible to decide presence of attachment and quality of an arranging state of insulating members 27, 28, 29 and 30. As a result, a reject product of electrochemical element 23 in which insulating members 27, 28, 29 and 30 are not attached or are not disposed in predetermined positions can be accurately eliminated through external visual recognition after the formation of electrochemical element 23. Accordingly, it is possible to stably supply an electronic component having low ESR and a very excellent short-circuit resistance.

In respect of ESR characteristics or electrostatic capacitance characteristics, particularly, the material which is applicable to separator 26 is selected for insulating members 27, 28, 29 and 30 so that the colors of insulating members 27, 28, 29 and 30 are similar to the color of separator 26 or various shadows are formed by an ambient light. Thus, precision in decision through external visual recognition by means of an image recognition camera is reduced. Also in that case, by irradiating a light on only ends 21b and 22b and protruded portions 27b, 28b, 29b and 30b of insulating members 27, 28, 29 and 30, it is possible to increase a difference in a contrast from the other portions of end face 23a, resulting in an enhancement in the precision in the decision. As a result, it is possible to provide an electronic component which has low ESR and a large capacity, and stably ensures a very excellent short-circuit resistance and has a high reliability. Moreover, a mass production can be carried out continuously at a high speed. Therefore, the production can be rationalized.

Second Exemplary Embodiment

Figure 5:
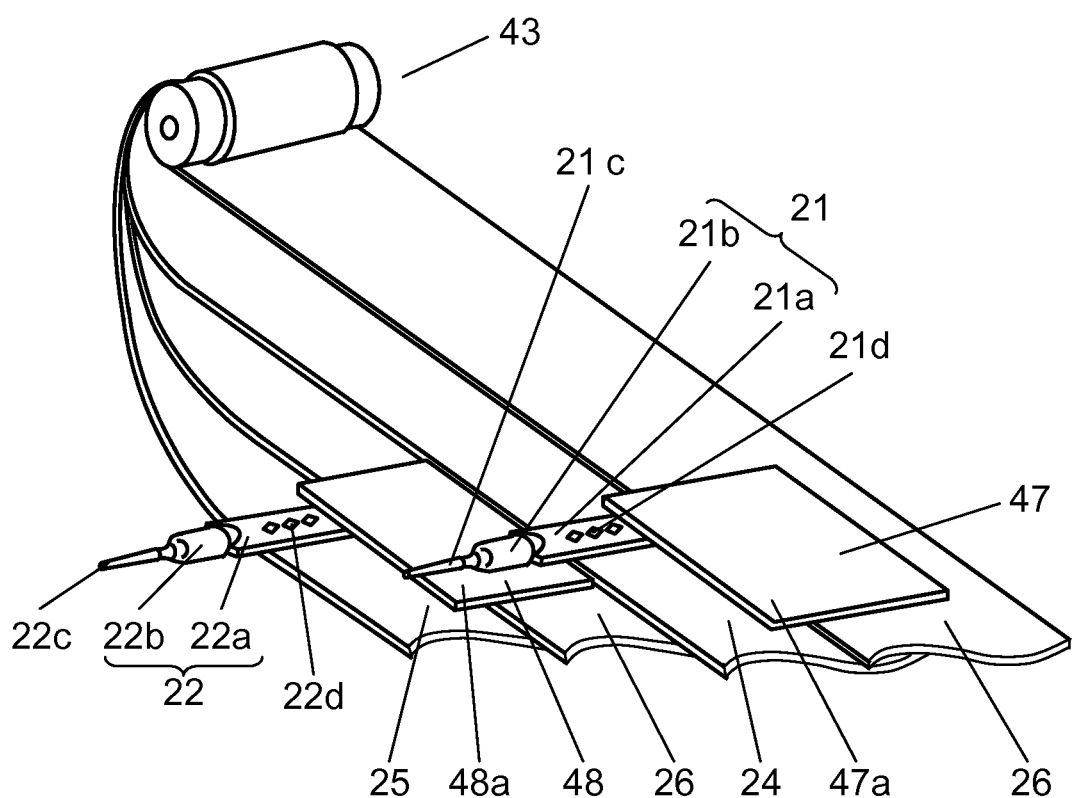
FIG. 5 is a developed perspective view showing a capacitor element of an electrolytic capacitor according to an example of an electronic component in accordance with a second exemplary embodiment of the present invention.
Figure 6:
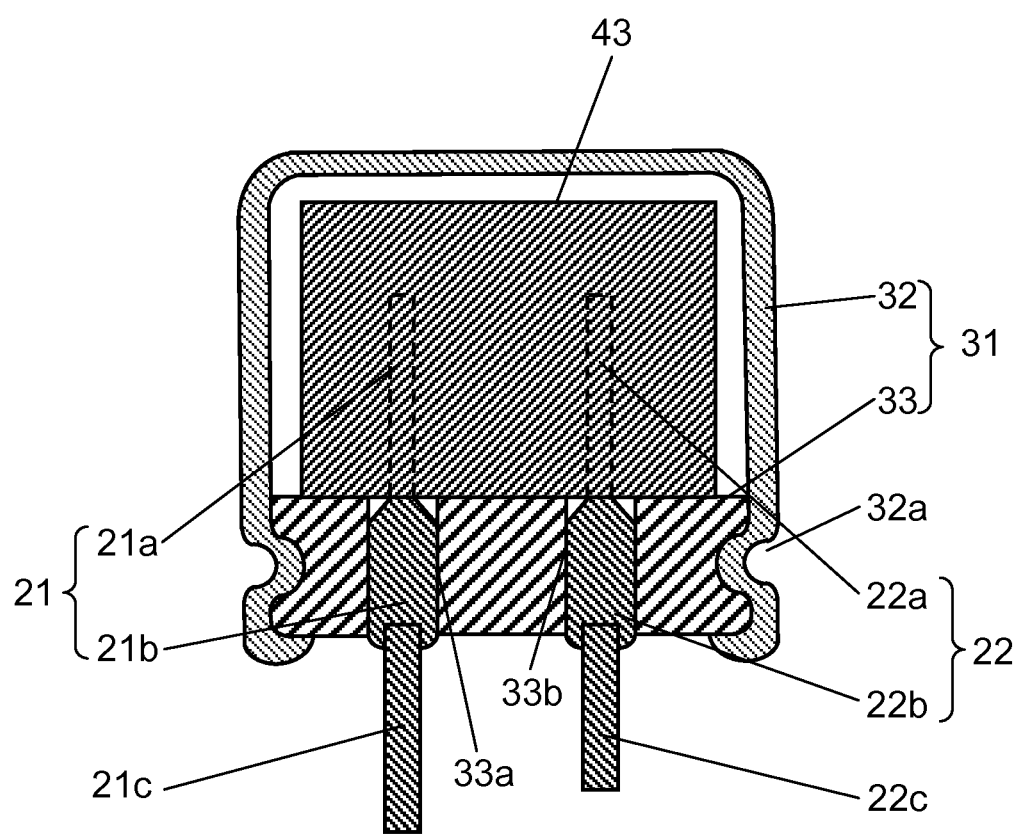
FIG. 6 is a sectional view showing the electrolytic capacitor according to the second exemplary embodiment of the present invention.
Figure 7A:
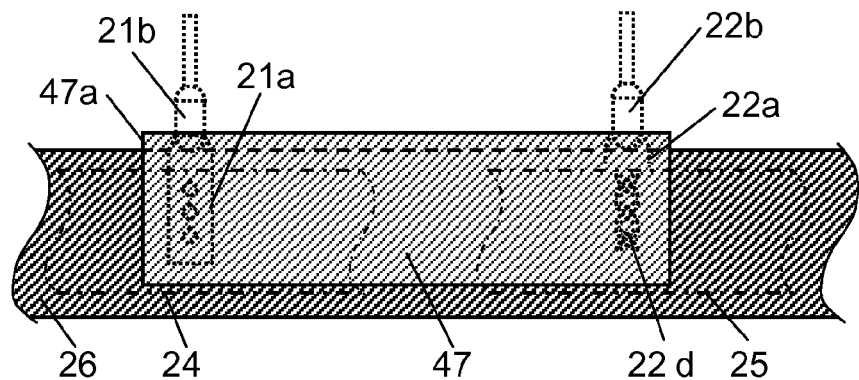
FIGS. 7A to 7C are views showing a step of attaching an insulating member to a separator and a step of deciding quality of attachment of an insulating member after forming the capacitor element in a process for manufacturing the electrolytic capacitor according to the second exemplary embodiment of the present invention.
Figure 7B:
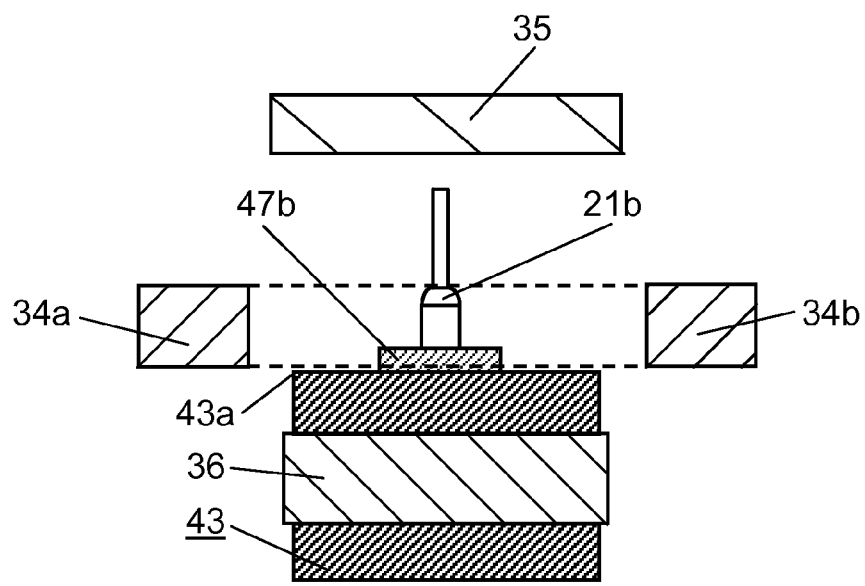
Figure 7C:
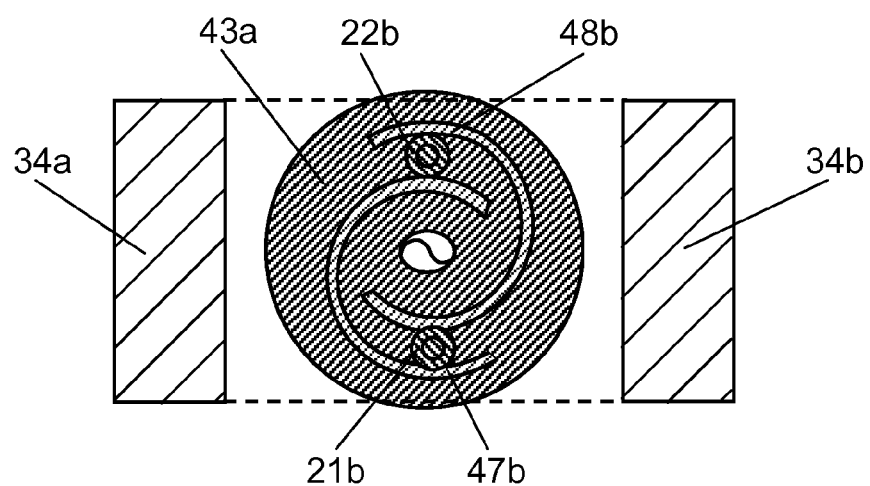
Figure 8:
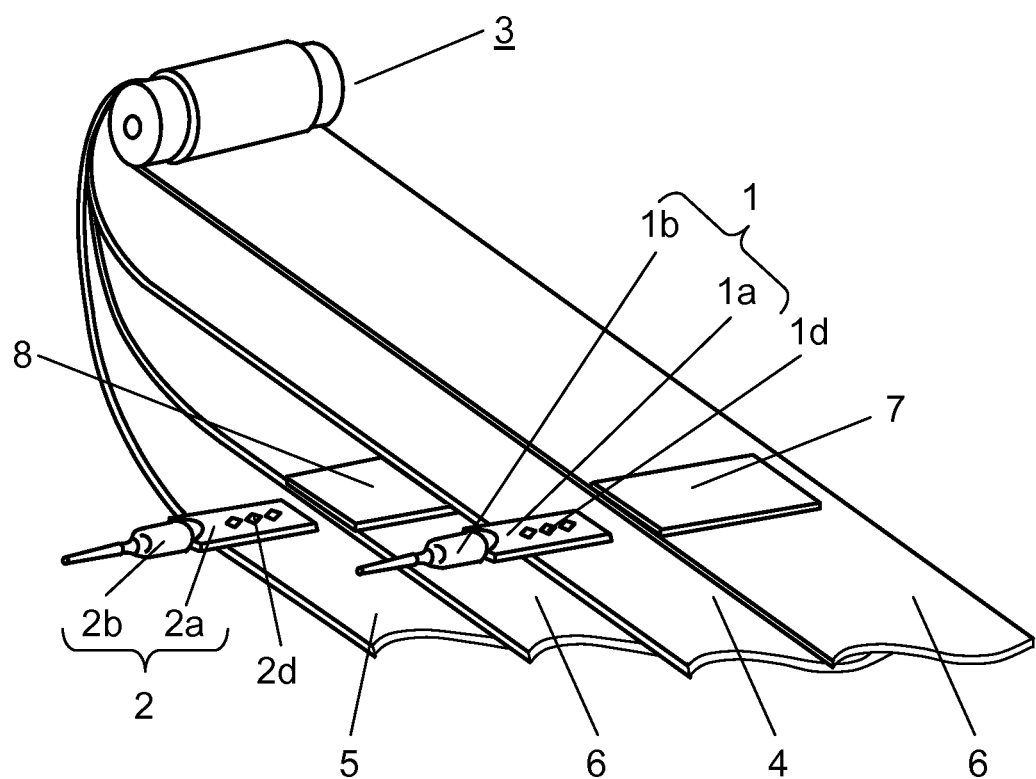
FIG. 8 is a developed perspective view showing a capacitor element of an electrolytic capacitor according to an example of an electronic component according to the related art.
Figure 9:
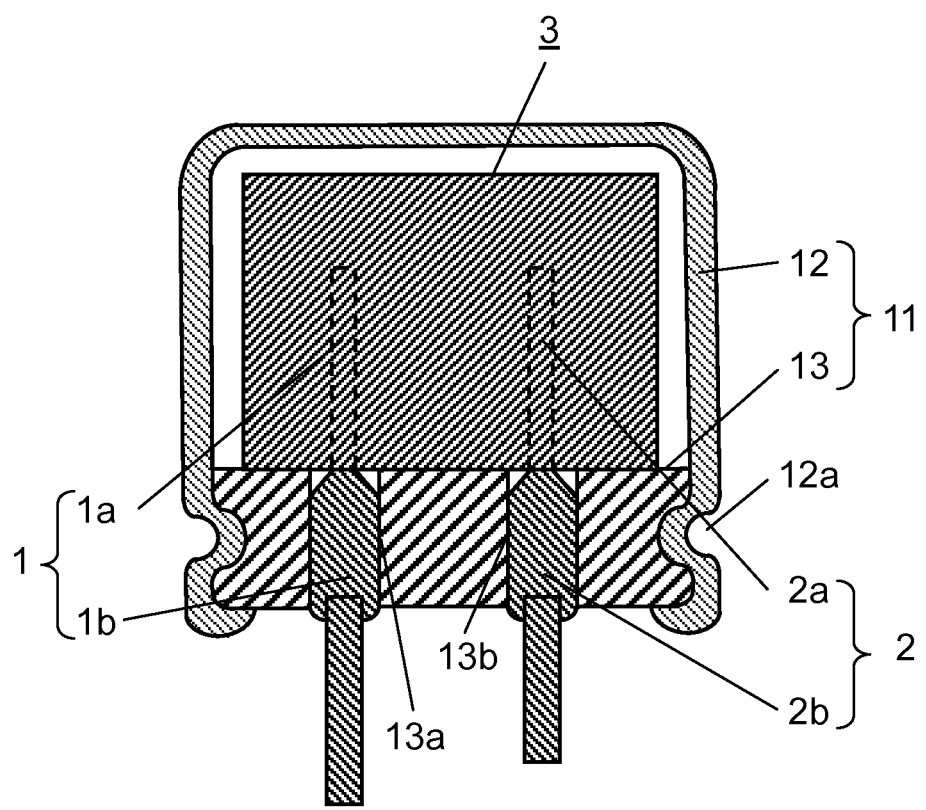
FIG. 9 is a sectional view showing the electrolytic capacitor according to the related art.

FIG. 5 is a developed perspective view showing a capacitor element of an electrolytic capacitor according to an example of an electronic component in accordance with a second exemplary embodiment of the present invention. FIG. 6 is a sectional view showing the electrolytic capacitor according to the second exemplary embodiment of the present invention. FIGS. 7A to 7C are views showing a step of attaching an insulating member to a separator and a step of deciding presence of attachment of an insulating member and quality of arrangement after fabricating a capacitor element in a process for manufacturing the electrolytic capacitor according to the second exemplary embodiment of the present invention.

The same structures as the electrolytic capacitor according to an example of the electronic component and the method of manufacturing the same in accordance with the first exemplary embodiment have the same reference numerals and description thereof will be omitted, and only different portions will be explained below.

First of all, the structure of the electrolytic capacitor according to an example of the electronic component in accordance with the second exemplary embodiment will be described with reference to FIGS. 5 to 7C.

In FIG. 5, different points from the electrolytic capacitor according to the first exemplary embodiment shown in FIG. 1 are as follows. First of all, insulating member 47 provided in a predetermined portion of separator 26 covers a range including a portion of separator 26 which is provided in contact with end 21a of leading terminal 21 at end 21a side of leading terminal 21 (the portion covered with insulating member 27 in the first exemplary embodiment). At the same time, insulating member 47 covers a range including a portion of separator 26 which is provided in contact with a convex portion generated by forming connecting portion 22d at cathode foil 25 side (the portion covered with insulating member 30 in the first exemplary embodiment). Similarly, insulating member 48 provided in a predetermined portion of separator 26 covers a range including a portion of separator 26 which is provided in contact with end 22a of leading terminal 22 at end 22a side of leading terminal 22 (the portion covered with insulating member 28 in the first exemplary embodiment). At the same time, insulating member 48 covers a range including a portion of separator 26 which is provided in contact with a convex portion generated by forming connecting portion 21d at anode foil 24 side (the portion covered with insulating member 29). In other words, in four insulating members 27, 28, 29 and 30 used in capacitor element 23 according to the first exemplary embodiment, insulating member 27 and insulating member 30 are integrated to form insulating member 47, and furthermore, insulating member 28 and insulating member 29 are integrated to form insulating member 48. Anode foil 24 and cathode foil 25 are laminated and wound through separator 26 provided with insulating members 47 and 48 to constitute capacitor element 43 shown in FIG. 6.

Next, the method of manufacturing the electrolytic capacitor according to an example of the electronic component in accordance with the second exemplary embodiment having the structure mentioned above will be described with reference to FIGS. 7A to 7C.

Different points from the first exemplary embodiment shown in FIGS. 3A to 3E and FIGS. 4A and 4B are as follows. First of all, as shown in FIG. 7A, insulating member 47 is disposed on an outer surface of separator 26 to have projecting portion 47a which is protruded from an end of separator 26 by a predetermined dimension. Moreover, insulating member 47 is disposed to cover at least a portion of separator 26 which is predicted to correspond to end 21a of leading terminal 21 at end 21a side of leading terminal 21 and a portion of separator 26 which is predicted to correspond to a convex portion generated by forming connecting portion 22d at cathode foil 25 side respectively when capacitor element 43 is fabricated at a subsequent step. Similarly, insulating member 48 is disposed on the outer surface of separator 26 to have projecting portion 48a which is protruded from the end of separator 26 by a predetermined dimension. Furthermore, insulating member 48 is disposed to cover at least a portion of separator 26 which is predicted to correspond to end 22a of leading terminal 22 at end 22a side of leading terminal 22 and a portion of separator 26 which is predicted to correspond to a convex portion generated by forming connecting portion 21d at anode foil 24 side respectively when capacitor element 43 is fabricated at a subsequent step.

As described above, according to the electrolytic capacitor and the method of manufacturing the same in accordance with an example of the electronic component in the second exemplary embodiment, it is possible to decrease the number of the insulating members to be attached to separator 26. Therefore, it is possible to shorten a production tact at a step of attaching the insulating member to separator 26. As a result, it is possible to provide an electronic component which has low ESR and a large capacity and stably ensures an excellent short-circuit resistance. Furthermore, it is possible to carry out a mass production continuously at a higher speed. Therefore, the productivity of the electronic component can be enhanced.

Specific examples 1 to 8 and comparative example 1 will be described below.

Example 1

As example 1 of the electrolytic capacitor according to the exemplary embodiment of the present invention, there is fabricated an electrolytic capacitor (a diameter of $\phi$10 mm and a length of 50 mm) of a winding-shaped capacitor element type which has a rated voltage of 450 V and an electrostatic capacitance of 47 μF.

First of all, as shown in FIG. 5, anode foil 24 formed of aluminum, cathode foil 25 formed of aluminum and separator 26 are cut to have certain widths and lengths. The width of separator 26 is set to be greater than the widths of anode foil 24 and cathode foil 25.

A surface of anode foil 24 has a surface area increased by an etching process, and furthermore, a dielectric layer constituted by an oxide aluminum film is formed by an anodizing process. Moreover, a surface of cathode foil 25 also has a surface area increased by the etching process.

A kraft and cotton based double paper is used for separator 26.

Next, leading terminals 21 and 22 formed of aluminum are prepared, and ends 21a and 22a of leading terminals 21 and 22 are connected to anode foil 24 and cathode foil 25 by a needle caulking connecting method respectively, thereby forming connecting portions 21d and 22d.

On the other hand, insulating member 47 is disposed on an outer surface of separator 26 to have projecting portion 47a which is protruded from an end of separator 26 by a predetermined dimension. A predetermined dimension in a length direction of projecting portion 47a is preset in such a manner that a dimension of protruded portion 47b of insulating member 47 protruded from end face 43a of capacitor element 43 is 0.1 mm when capacitor element 43 is fabricated at a subsequent step. Furthermore, insulating member 47 is disposed to cover at least a portion of separator 26 which is predicted to correspond to end 21a of leading terminal 21 at end 21a side of leading terminal 21 and a portion of separator 26 which is predicted to correspond to a convex portion generated by forming connecting portion 22d at cathode foil 25 side.

Similarly, insulating member 48 is disposed on an outer surface of separator 26 to have projecting portion 48a which is protruded from an end of separator 26 by a predetermined dimension. A predetermined dimension in a length direction of projecting portion 48a is preset in such a manner that a dimension of protruded portion 48b of insulating member 48 protruded from end face 43a of capacitor element 43 is 0.1 mm when capacitor element 43 is fabricated at a subsequent step. Furthermore, insulating member 48 is disposed to cover at least a portion of separator 26 which is predicted to correspond to end 22a of leading terminal 22 at end 22a side of leading terminal 22 and a portion of separator 26 which is predicted to correspond to a convex portion generated by forming connecting portion 21d at anode foil 24 side.

Insulating members 47 and 48 take square shapes and an adhesive is applied to a single side of each of insulating members 47 and 48. Then, insulating members 47 and 48 are stuck and fixed to separator 26.

A kraft based double paper is used for materials of insulating members 47 and 48, and an acrylic adhesive which can be prevented from being dissolved into an electrolytic solution to influence characteristics of the electrolytic capacitor is used for a material of the adhesive.

Then, anode foil 24 and cathode foil 25 are laminated with separator 26 therebetween which provided with insulating members 47 and 48, and anode foil 24, separator 26 and cathode foil 25 are wound like a roll to take an almost cylindrical shape in order to lead ends 21b and 22b of leading terminals 21 and 22. Thereafter, insulating tape 36 is wound around an outer peripheral side surface to be fixed so that capacitor element 43 is fabricated.

Referring to capacitor element 43 thus fabricated, subsequently, presence of attachment of insulating members 47 and 48 and quality of arrangement are decided. The decision is carried out by irradiating a straight light on only protruded portions 47b and 48b of insulating members 47 and 48 and ends 21b and 22b of leading terminals 21 and 22 and visually recognizing a state of end face 43a by using image recognition camera 35 disposed above end face 43a. More specifically, capacitor element 43 is fixed and light sources 34a and 34b are disposed opposite to each other around capacitor element 43. A straight light is irradiated from light sources 34a and 34b in almost parallel with end face 43a, and protruded portions 47b and 48b of insulating members 47 and 48 and ends 21b and 22b of leading terminals 21 and 22 are exposed to the light and the light is thus scattered.

As light sources 34a and 34b for the straight light, a white light emitting diode having a power of 2.9 W is used.

By using image recognition camera 35, there are visually recognized the positional relationship between protruded portion 47b and end 21b of leading terminal 21 where the light is scattered, the positional relationship between protruded portion 47b and end 22b of leading terminal 22, the positional relationship between protruded portion 48b and end 21b of leading terminal 21, and the positional relationship between protruded portion 48b and end 22b of leading terminal 22.

First of all, it is decided whether insulating members 47 and 48 are attached or not. In the decision, presence of protruded portions 47b and 48b of insulating members 47 and 48 protruded from end face 43a of capacitor element 43 is visually recognized. In other words, if it can be confirmed that protruded portions 47b and 48b are protruded from end face 43a of capacitor element 43, it is decided that insulating members 47 and 48 are attached. On the other hand, if it cannot be confirmed that protruded portions 47b and 48b are protruded from end face 43a of capacitor element 43, it is decided that insulating members 47 and 48 are not attached.

If it is decided that insulating members 47 and 48 are attached, furthermore, it is decided whether insulating members 47 and 48 are normally disposed or not. A shift in a length direction is decided by visually recognizing the positional relationship between protruded portion 47b and end 21b of leading terminal 21 led from end face 43a, and the positional relationship between protruded portion 48b and end 22b of leading terminal 22 led from end face 43a. Positions of ends 21b and 22b and positions of protruded portions 47b and 48b are visually recognized. If protruded portions 47b and 48b are protruded in the length direction from a predetermined position, it is decided that a non-reject product having no shift in the length direction is obtained. If they are not protruded, it is decided that a reject product having the shift is obtained. Capacitor element 43 decided to be the reject product is eliminated.

Capacitor element 43 in which a difference in a contrast between protruded portions 47b and 48b and a periphery thereof is not clear is treated as the defective product and is thus eliminated.

Next, capacitor element 43 decided to be the non-reject product is impregnated with an electrolytic solution containing ethylene glycol as a main component by vacuum impregnation, and capacitor element 43 is then inserted into outer case 32 formed of aluminum.

Then, ends 21b and 22b of leading terminals 21 and 22 led from capacitor element 43 are inserted into a pair of through holes 33a and 33b provided on sealing member 33 formed by a rubber packing respectively, thereby attaching sealing member 33 to capacitor element 43 and disposing sealing member 33 in the opening portion of outer case 32.

Thereafter, an outer peripheral side surface in the vicinity of the opening portion of outer case 32 is wound and fastened to form throttling portion 32a, and a compressive stress is generated on sealing member 33 constituted by an elastomer to seal the opening portion of outer case 32.

Subsequently, a voltage is applied between ends 21b and 22b of leading terminals 21 and 22 which are led out to carry out chemical conversion over anode foil 24 again. Thus, the electrolytic capacitor according to example 1 is fabricated.

In contract to the structure according to example 1, in examples 2 to 8, the dimensions of protruded portions 47b and 48b of insulating members 47 and 48 which are protruded from end face 43a of capacitor element 43 are varied. They will be described below in detail.

Example 2

In example 2, the dimension of the protruded portion according to example 1 is regulated to be 0.2 mm. The others are set to be the same as in example 1.

Example 3

In example 3, the dimension of the protruded portion according to example 1 is regulated to be 0.3 mm. The others are set to be the same as in example 1.

Example 4

In example 4, the dimension of the protruded portion according to example 1 is regulated to be 0.4 mm. The others are set to be the same as in example 1.

Example 5

In example 5, the dimension of the protruded portion according to example 1 is regulated to be 0.5 mm. The others are set to be the same as in example 1.

Example 6

In example 6, the dimension of the protruded portion according to example 1 is regulated to be 0.6 mm. The others are set to be the same as in example 1.

Example 7

In example 7, the dimension of the protruded portion according to example 1 is regulated to be 0.7 mm. The others are set to be the same as in example 1.

Example 8

In example 8, the dimension of the protruded portion according to example 1 is regulated to be 0.8 mm. The others are set to be the same as in example 1.

Moreover, there is fabricated an electrolytic capacitor to be compared with examples 1 to 8.

Comparative Example 1

In comparative example 1, the dimension of the protruded portion according to examples 1 to 8 is regulated to be 0 mm, that is, the protruded portion is not provided. The others are set to be the same as in example 1.

100 non-reject product samples of the electrolytic capacitor according to each of examples 1 to 8 are fabricated. Moreover, 100 samples of the electrolytic capacitor according to comparative example 1 are also fabricated. A result obtained deciding the quality of the capacitor element in a fabricating process according to each of examples 1 to 8 and a result obtained by executing an overvoltage test for the finished electrolytic capacitor according to comparative example 1 are shown in (Table 1).

In the overvoltage test, a voltage of 675 V and a current of 1 A at an ordinary temperature are applied to the sample of the electrolytic capacitor. Referring to the decision of the quality, there is checked presence of a short circuit caused by contact of end 21b of the leading terminal and cathode foil 25 or contact of end 22b of the leading terminal and anode foil 24 after the application of the overvoltage. The electrolytic capacitor causing the short circuit is decided as a reject product.

As is apparent from the (Table 1), referring to the electrolytic capacitor according to comparative example 1, it is impossible to confirm whether or not insulating members 47 and 48 are properly attached and disposed after capacitor element 43 is fabricated. For this reason, even capacitor element 43 to be the reject product cannot be prevented from flowing to a subsequent assembling step.

On the other hand, referring to the electrolytic capacitor according to examples 1 to 8, insulating members 47 and 48 have protruded portions 47b and 48b which are protruded from end face 43a in the state of capacitor element 43. Consequently, it is possible to visually recognize presence of attachment of insulating members 47 and 48 and quality of arrangement of insulating members 47 and 48. For this reason, also after capacitor element 43 is fabricated, the defective product can be eliminated accurately. As a result, in the case in which an overvoltage is applied to the finished electrolytic capacitor, an insulating property around ends 21a and 22a of leading terminals 21 and 22 can be reliably ensured. Thus, it is possible to obtain an electrolytic capacitor having a high short-circuit resistance and a high reliability.

In examples 1 to 3, moreover, protruded portions 47b and 48b are provided and the protruding dimensions are small. In some cases, therefore, they tend to be influenced by a variation in an irradiation angle of a straight light or the like so that a difference in a contrast is made unclear. In these cases, the capacitor element 43 to be the reject product is prevented from flowing to a subsequent step. However, there is increased a probability that an non-reject product might be decided to be a reject product. In order to stabilize precision in the decision, it is preferable that the dimension of the protruded portion should be equal to or greater than 0.4 mm as described in examples 4 to 8.

The electronic component according to the present invention is useful as an electronic component to be applied to a smoothing circuit or a control circuit for power output/input in a digital AV apparatus or an automobile electrical apparatus in which a high reliability is required for a long period of time, or the like.

TABLE 1

| | | CAPACITOR ELEMENT | | RATE OF GENERATION OF SHORT CIRCUIT AFTER OVERVOLTAGE TEST (%) * NUMERIC VALUE IN PARENTHESIS INDICATE NUMBER OF GENERATED SHORT CIRCUIT/ NUMBER OF TEST |
|---|---|---|---|---|
| | DIMENSION OF PROTRUDED PORTION (mm) | NUMBER OF NON-REJECT PRODUCT DECIDED * NUMBER OF SAMPLE IN COMPARATIVE EXAMPLE | NUMBER OF REJECT PRODUCT DECIDED | |
| | | | ERRONEOUS DECISION (NON-REJECT PRODUCT) | REJECT PRODUCT |
| EXAMPLE 1 | 0.1 | 100 | 17 | 3 | 0 (0/100) |
| EXAMPLE 2 | 0.2 | 100 | 10 | 2 | 0 (0/100) |
| EXAMPLE 3 | 0.3 | 100 | 5 | 3 | 0 (0/100) |
| EXAMPLE 4 | 0.4 | 100 | 0 | 3 | 0 (0/100) |
| EXAMPLE 5 | 0.5 | 100 | 0 | 2 | 0 (0/100) |
| EXAMPLE 6 | 0.6 | 100 | 0 | 3 | 0 (0/100) |
| EXAMPLE 7 | 0.7 | 100 | 0 | 3 | 0 (0/100) |
| EXAMPLE 8 | 0.8 | 100 | 0 | 2 | 0 (0/100) |
| COMPARATIVE EXAMPLE 1 | 0 | 100 | — | — | 3 (3/100) |

What is claimed is:

1. An electronic component comprising: an electric element constituted by multiple laminated layers including a first electrode foil, a second electrode foil, and a separator interposed between the first and second electrode foils, such that the second electrode foil faces the first electrode foil across the separator;
   a first leading terminal having a first end and a second end, the first end of the first leading terminal being connected to a portion of the first electrode foil, the second end of the first leading terminal protruding outwardly from an end of the electric element;
   a first insulating member interposed between the second electrode foil and said portion of the first electrode foil;
   an electrolyte impregnated in the electric element; and
   an outer housing accommodating the electric element and the electrolyte; wherein the first insulating member has an end protruding outwardly from said end of the electric element in a same direction that said second end of the first leading terminal protrudes outwardly from said end of the electric element; and
   wherein the end of the first insulating member protrudes by 0.1 mm or more from said end of the electric element and is accommodated in the outer housing.

2. The electronic component according to claim 1, further comprising:
   a second leading terminal having a first end and a second end, the first end of the second leading terminal being connected to a portion of the second electrode foil, the second end of the second leading terminal protruding outwardly from said end of the electric element; and
   a second insulating member interposed between the first electrode foil and said portion of the second electrode foil,
   wherein the second insulating member has an end protruding outwardly from said end of the electric element in a same direction that said second end of the second leading terminal protrudes outwardly from said end of the electric element.

3. The electronic component according to claim 1, further comprising
   a second leading terminal having a first end and a second end, the first end of the second leading terminal being connected to a portion of the second electrode foil, the second end of the second leading terminal protruding outwardly from said end of the electric element,
   wherein the first insulating member extends continuously from a position between the second electrode foil and said portion of the first electrode foil to a position between the first electrode foil and said portion of the second electrode foil.

4. The electronic component according to claim 1,
   wherein the first electrode foil has a surface facing the separator,
   wherein the second electrode foil has a surface facing the separator,
   wherein said portion of the first electrode foil has a part of the surface of the first electrode foil, and
   wherein the first insulating member is interposed between said part of the surface of the first electrode foil and the surface of the second electrode foil.

5. The electronic component according to claim 4,
   wherein the separator is situated on the surface of the first electrode foil, and
   wherein the separator is situated on the surface of the second electrode foil.

6. The electronic component according to claim 1, wherein the first electrode foil, the separator, and the second electrode foil are configured in a rolled-up structure in which the first electrode foil, the separator, and the second electrode foil are rolled-up together.

7. The electronic component according to claim 6, wherein
   the outer housing includes an outer case having a closed end and an open end, and a sealing member disposed in the open end of the outer case to cover the open end of the outer case, and
   the sealing member has a through hole therein, said first leading terminal extending through said through hole.

8. The electronic component according to claim 2, wherein the first electrode foil, the separator, and the second electrode foil are configured in a rolled-up structure in which the first electrode foil, the separator, and the second electrode foil are rolled-up together.

9. The electronic component according to claim 8, wherein
   the outer housing includes an outer case having a closed end and an open end, and a sealing member disposed in the open end of the outer case to cover the open end of the outer case, and
   the sealing member has first and second through holes therein, said first and second leading terminals extending through said first and second through holes, respectively.

* * * * *